Feb. 18, 1969  E. E. RHOADS  3,428,199
APPARATUS FOR MANIPULATING BILLETS AND THE LIKE
Filed Oct. 11, 1966

INVENTOR
EDWIN E. RHOADS
BY Yount, Raney, Flynn & Tarolli
ATTORNEYS

INVENTOR
EDWIN E. RHOADS

BY Yount, Raney, Flynn & Tarolli

ATTORNEYS

Feb. 18, 1969 E. E. RHOADS 3,428,199
APPARATUS FOR MANIPULATING BILLETS AND THE LIKE
Filed Oct. 11, 1966

INVENTOR
EDWIN E. RHOADS

BY Yount, Ramy, Flynn, & Tarolli

ATTORNEYS

United States Patent Office 3,428,199
Patented Feb. 18, 1969

3,428,199
APPARATUS FOR MANIPULATING BILLETS AND THE LIKE
Edwin E. Rhoads, Solon, Ohio, assignor, by mesne assignments, to Pettibone Mulliken Corporation, Chicago, Ill., a corporation of Delaware
Filed Oct. 11, 1966, Ser. No. 585,799
U.S. Cl. 214—340      14 Claims
Int. Cl. B65g 7/00; B25j 3/00

ABSTRACT OF THE DISCLOSURE

A workpiece positioning apparatus for grinding machines or the like wherein means are provided for repeatedly tilting a rectangular or polygonal workpiece so that it will present fresh grinding surfaces to a grinding wheel or, alternatively, for repeatedly rotating a cylindrical workpiece throughout a limited extent for the same purpose.

---

The present invention relates to an apparatus for manipulating relatively heavy workpieces, such as metal billets and the like, so that different parts of the surface of the workpiece can be operated on by a machine tool, for example, for working and/or inspecting the surface of the workpiece.

It is an important object of the present invention to provide a new and improved versatile apparatus capable of manipulating elongated workpieces having planar surfaces as well as those having arcuate surfaces by rotating the workpieces about their longitudinal axes.

Another object of the present invention is the provision of a new and improved apparatus for manipulating elongated workpieces of different cross-sectional configurations and which apparatus operates to manipulate workpieces having planar surfaces by withdrawing part of a horizontal support surface for the workpieces, causing the workpieces to topple onto a sloping support surface where they are thereafter elevated and supported by the horizontal support surface with a different surface presented for a work operation thereon and manipulates workpieces having arcuate surfaces by supporting them in part by a lateral support surface or abutment which prevents the workpieces from shifting laterally of the apparatus while a workpiece rotating drive member is moved into driving engagement with the surface of the workpieces and moved tangentially thereto so that the member rotates the workpieces against the abutment to thereby successively present different portions of the arcuate surface for work operation thereon.

Yet another object of the present invention is the provision of a new and improved apparatus for manipulating elongated workpieces having arcuate surfaces and which apparatus can be readily attached to an existing apparatus for manipulating rectangular billets to adapt the rectangular billet turning apparatus for rotating billets having arcuate surfaces.

A further object of the present invention is to provide a new and improved apparatus for manipulating elongated workpieces having arcuate surfaces supported at spaced locations on the circumference by support surfaces angularly arranged relative to one another, one of the surfaces providing a lateral support for the workpieces to hold the workpieces against lateral movement while a driven drive surface, such as a rotatable drive wheel, is moved into tangential engagement with the workpieces to rotate the workpieces about their longitudinal axes.

A still further object of the present invention is the provision of a new and improved apparatus of the type noted in the preceding paragraph wherein the workpieces are held in their new positions by a clamping member which clamps the workpieces against the lateral support member which lies in a substantially vertical plane and the other support surfaces for the workpieces lie in a generally horizontal plane.

Other objects and advantages of the invention will be apparent from the following description of a preferred form thereof, reference being made to the accompanying drawings wherein.

Figure 1:
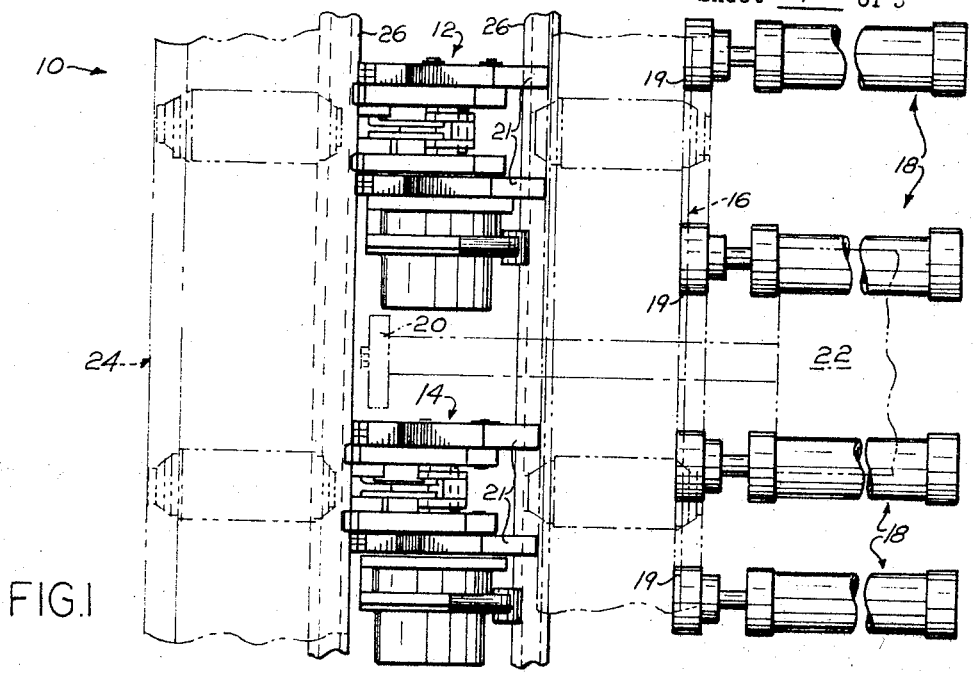
FIG. 1 is a schematic plan view of an apparatus embodying the invention and associated with a grinding machine for grinding surfaces of billets and the like supported by the apparatus to present different surfaces of the billet to the grinding wheel of the machine.
Figure 3:
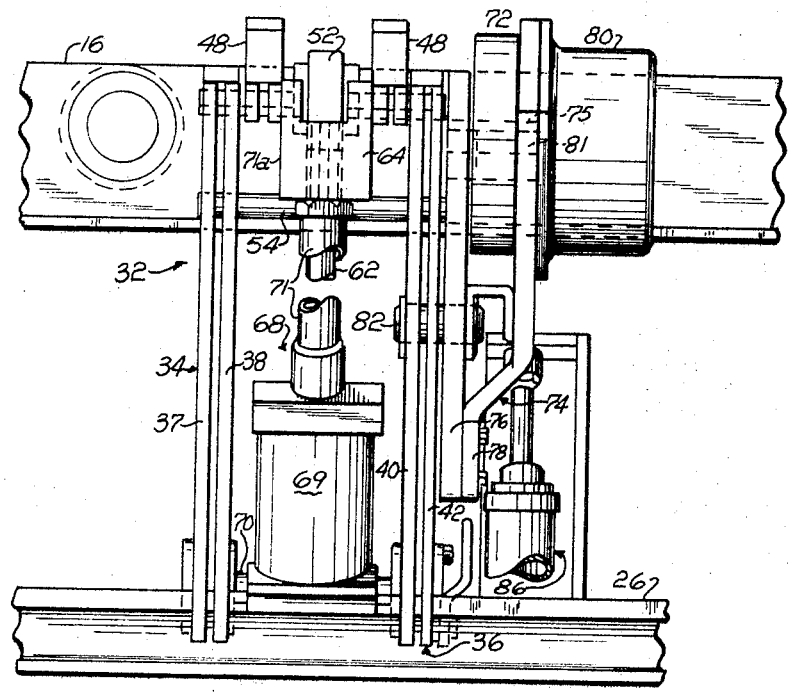
FIG. 3 is an elevational view of the apparatus of FIG. 2 taken substantially along line 3—3 of FIG. 2.
Figure 2:
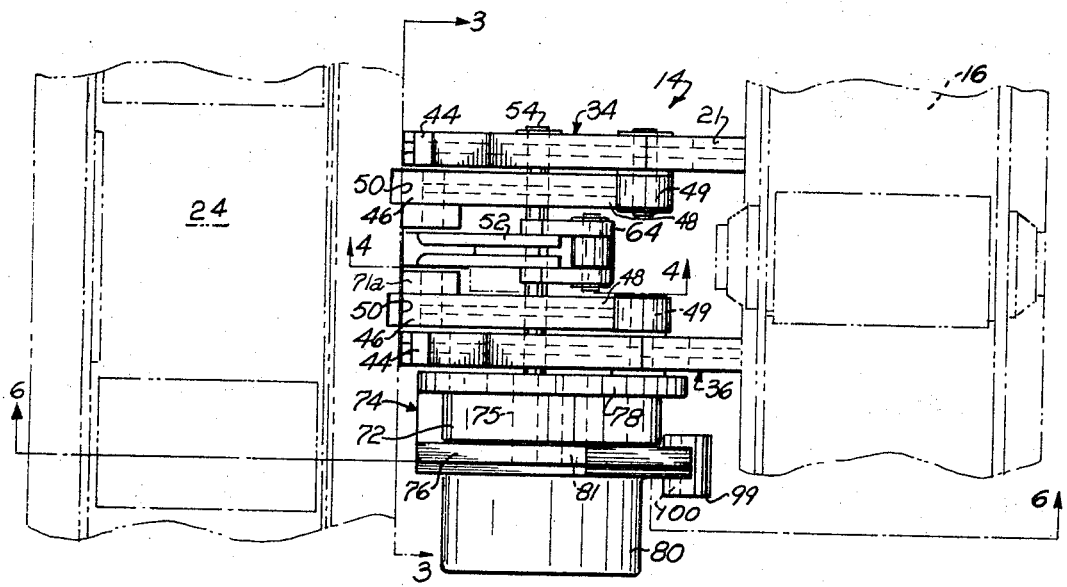
FIG. 2 is a plan view of a part of the apparatus shown in FIG. 1 and is on a larger scale.

The present invention provides an apparatus for manipulating relatively heavy, elongated workpieces so that different portions of the surface thereof may be presented in succession for a work operation thereon. The apparatus is versatile in operation in that it can accommodate and manipulate workpieces having different surface configurations, such as those having planar surfaces as well as those having arcuate surfaces or a combination of planar and arcuate surface configurations. According to the illustrated embodiment of the invention, the workpieces having planar surfaces are manipulated by supporting the same on horizontal support surfaces and withdrawing part of the horizontal support surfaces so that the workpiece topples to one side onto a sloping support surface. The toppled workpiece is elevated into the horizontal plane of the horizontal support surfaces and is clamped in position with a different side thereof presented so that a work operation can be performed thereon. The illustrated apparatus manipulates workpieces having arcuate surfaces by providing support surfaces which extend at angles to one another, one of which support surfaces provides a lateral support to prevent the workpiece from shifting laterally of the apparatus while a workpiece rotating drive member, such as a wheel, is moved into tangential engagement with the workpiece to rotate the workpiece. The workpiece is clamped to the support surfaces after rotation with a different portion of its surface presented for a work operation thereon. The workpiece is clamped by a clamping member which holds a newly presented surface in position so that a work operation can be performed thereon without the workpiece moving in the apparatus. When the work operation is completed, the workpiece is ejected from the apparatus by the clamping member which moves the workpiece laterally from the apparatus onto a suitable receiving device, which may be a conveyor, after the lateral support surface for the workpiece has been lowered.

The apparatus, according to the present invention, may be used to manipulate workpieces so that various work operations can be performed thereon and is particularly suitable for manipulating billets and the like so that the surfaces thereof may be sequentially presented to a grinding machine. Accordingly, the present invention will be described in conjunction with a grinding apparatus for working the surfaces thereof.

Referring to the drawings, an apparatus for manipulating elongated workpieces is indicated generally by the reference numeral 10. The apparatus 10 includes a pair of billet turning units 12 and 14. The billet turning units 12 and 14 are horizontally spaced so that a workpiece W is supported thereby at two spaced locations along its length. The workpieces W are delivered to the turning units 12 and 14 by an infeed conveyor 16 which may be of the power driven roller type. The conveyor 16 conveys the workpiece to a position in proper alignment with the turning units 12 and 14. A transfer mechanism comprising four reciprocating rams 18 are supported at the right side and above the conveyor 16, as viewed in FIG. 6, and move transversely of the conveyor to engage and transfer the workpiece from the conveyor 16 to the turning units 12 and 14. The rams 18 have plates 19 on the free end thereof which are controlled to simultaneously engage the workpiece on the conveyor 16 and move it laterally to the turning units 12 and 14. The units 12 and 14 have aprons 21 arranged in close proximity to the discharge side of conveyor 16 to facilitate transfer of the workpiece from the conveyor 16 to units 12 and 14. Conventional controls, not shown, are provided to operate the rams 18 in unison.

The workpiece W is received and supported by the turning units 12 and 14 which are controlled to operate in unison to rotate the workpiece about its longitudinal axis and present different parts of the peripheral surface thereof in succession to a grinding wheel 20 of the grinding machine 22. The grinding machine 22 is of conventional construction and per se forms no part of the present invention and accordingly, will not be described in detail herein. Suffice it to say that the grinding wheel 20 is supported above the workpieces and is capable of grinding the upwardly facing segment or part of the peripheral surface of the workpiece along the entire length thereof as the different surface portions are presented by the turning units 12 and 14. When the grinding operation has been completed on the workpiece W, it is ejected laterally from the turning units 12 and 14 onto an outfeed or delivery conveyor 24 which conveys the workpieces away from the apparatus 10. The delivery conveyor 24 is shown to be of the power driven roller type similar to that of the infeed conveyor 16.

The apparatus 10 can accommodate different length workpieces by providing for adjustment of the horizontal distance between the turning units 12 and 14. The units 12 and 14 are supported for bodily movement on a pair of rails 26 which extend parallel to the conveyors 16 and 24. Each of the turning units 12 and 14 have box-like frames 28. The frames 28 have cutout areas 29 at the lower parts of two sides and within which the rails 26 are received. A plurality of cam-type locking mechanisms 30 are supported on frame 28 adjacent cutout areas 29 and move into engagement with rails 26 to lock the units to the rails. One or both turning units 12 and 14 are moved along the rails 26 until they are spaced the proper distance to accommodate a particular length workpiece. After the units have been properly positioned, they are locked to the rails by rotating the handles of the lock mechanism 30.

The turning units 12 and 14 are substantially identical in construction and operation and for sake of brevity, only unit 14 is shown and described in detail.

The box-like frame structure 28 of unit 14 comprises spaced side plates 34 and 36, interconnected by suitable cross bracing to form a sturdy mobile support for the turning mechanism. The side plate 34 is formed of spaced plates 37, 38, welded or otherwise connected, and side plate 36 is formed of plates 40 and 42, also connected by welding or other means.

The workpiece W is supported in a substantially horizontal plane by pairs of relatively movable support surfaces 44 and 46 on frame 28. Support surfaces 44 are stationary and are formed as an integral part of side plates 34 and 36 at the upper left corners thereof, as viewed in the drawings. Cooperating with the fixed horizontal surfaces 44 are movable support surfaces 46 formed at the upwardly facing surface of movable lift arms or members 48. The lift arms 48 are pivotally supported on side plates 34 and 36 by pins 49. The movable support surfaces 46 are positioned in the horizontal plane of the stationary support surfaces 44 when a workpiece is to be received from the infeed conveyor 16. Support surfaces 44 and 46 engage the underside of the workpiece and vertically extending support surfaces or abutments 50 provided on the ends of the lift arms 48 engage one side of the workpiece and provide lateral support for the workpiece to prevent the workpiece from moving laterally off the support surfaces 44 and 46.

The workpiece W is clamped against the support surfaces 44, 46 and particularly, the abutments 50 by a clamping member 52. The clamping member 52 is mounted intermediate the lift members 48 and is supported for pivotal movement about a horizontal axis by a shaft 54 journaled in side plates 34 and 36. The clamp member 52 and particularly, the clamping end 52a is movable in an arcuate path toward and away from the lateral support surfaces 50 to respectively clamp and release a workpiece positioned on the support surfaces. The clamping member 52 is moved by a double-acting piston and cylinder type hydraulic motor 56. The motor 56 includes the usual cylinder 58 pivotally connected to side plates 34 and 36 and a piston rod 62. The piston rod 62 is connected to clamping member 52 by a clevis 64. Suitable controls are provided to direct fluid to cylinder 58 to move clamping member 52 into and out of engagement with the workpiece.

When the clamping member 52 is in clamping engagement with the workpiece W, the grinding wheel 20 can be brought into working engagement with the upper surface of the workpiece. If the workpiece to be worked upon by the grinding wheel 20 has a planar surface, such as one rectangular in cross-sectional configuration, designated W–1 in FIGS. 4 and 5, the grinding wheel 20 will work on the surface of the upper side of the workpiece until that surface has been finished. If the workpiece has an arcuate surface, such as those having a circular cross-sectional configuration, designated W–2 and W–3 in FIG. 6, the grinding wheel 20 will work on the uppermost portion of the surface of the workpiece which is accessible to the grinding wheel 20. After the grinding wheel 20 has completed work on the accessible surface of the workpiece, the workpiece is rotated by the units 12 and 14 about its longitudinal axis to present a different surface portion to the grinding wheel.

A workpiece W–1, rectangular in cross-section, can be rotated by lowering the movable support surfaces 46 on arms 48 below the horizontal plane passing through the stationary support surfaces 44 which transfers the entire support of the workpiece to the stationary support surfaces 44. Since the width of stationary support surfaces 44 is substantially less than the width of the workpiece W–1, the workpiece will topple to the right, as viewed in the drawings, onto sloping surfaces 66 provided in the upper sides of plates 34 and 36. The toppled workpiece comes to rest on the lowered support surfaces 46 which then elevates it into the horizontal plane of the stationary support surfaces 44. The rotated workpiece W–1 is moved laterally onto the stationary support surfaces 44 and into engagement with the lateral supports 50 by the clamping member 52. This operation presents an unworked upper surface to the grinding wheel 20. When the grinding wheel 20 completes the grinding operation on the newly presented side, the described operation is repeated and presents yet another side of the workpiece W–1 to the grinding wheel 20.

The apparatus 10 is also capable of positioning the workpiece, for example, rectangular workpiece W–1, so that the corners are presented to the grinding wheel 20. This manipulation of the workpiece is provided by lowering the lift arms 48 and the workpiece topples onto sloping surfaces 66 and lowered support surfaces 46 which have been lowered a predetermined extent below the plane of support surfaces 44 so that the corner of the workpiece W-1 is at the proper elevation. Thereafter, the clamping arm 52 is moved to engage a corner of workpiece W-1 adjacent the corner to be worked on by the grinding wheel 20 and clamps the workpiece against the sloping surfaces 66. The clamping portion 52a of a clamping arm 52 engages the corner of workpiece W-1 at the intersection of the relatively inclined surfaces thereof indicated at 52b in FIG. 4.

The lift arms 48 are pivoted about the axes of pins 49 by a piston and cylinder-type hydraulic motor 68. Motor 68 includes a cylinder 69 pivotally supported by a pin 70 on sides of plates 34 and 36 and a piston rod 71. The end of piston rod 71 is connected to the left ends of the lift arms 48 by a clevis 71a. Conventional controls are provided to control the application of fluid to the motor 68 to simultaneously pivot the arms 48 to position the surfaces 46 in and below the horizontal plane passing through the stationary support surfaces 44. When the grinding and inspection of the workpiece has been completed, the arms 48 are lowered to position the lateral support surfaces 50 below the plane of surfaces 44 and clamping member 52 ejects the workpiece from the stationary support surfaces 44 onto the delivery conveyor 24. The arms 48 are returned to their position disclosed in FIG. 4 and the clamping member 52 is moved below the horizontal plane of surfaces 44 and 46 and the apparatus is ready to receive another workpiece from the conveyor 16. The apparatus described in detail thus far is similar to the rectangular billet turning apparatus disclosed and claimed in my copending application, S.N. 558,448, filed June 17, 1966.

Figure 4:
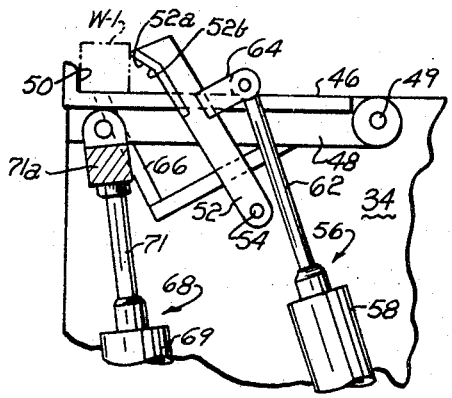
FIG. 4 is a fragmentary sectional view taken substantially along line 4—4 of FIG. 2.
Figure 5:
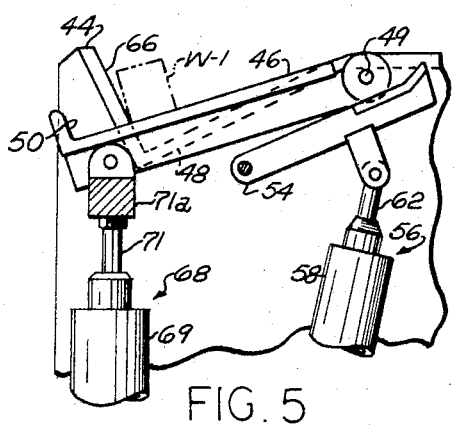
FIG. 5 is a view similar to FIG. 4 and showing parts of the apparatus in different positions during turning of a billet.

When the workpieces to be handled by the apparatus 10 are generally circular or like in cross-sectional configuration, the lift arms 48 are arranged in their horizontal position, as shown in FIG. 4. A circular workpiece W-2 or W-3 is transferred from the infeed conveyor 16 onto the support surfaces 46 of arms 48 and the stationary surfaces 44. The clamping member 52 is moved to clamp the workpiece to support surfaces 44, 46, and 50. The grinding wheel 20 then operates on the uppermost surface portion of the workpiece. When the grinding operation has been completed on the portion of the workpiece surface accessible to the grinding wheel 20, the circular workpiece is rotated about its longitudinal axis by a drive wheel 72 to present a different portion of the surface to the grinding wheel.

The drive wheel 72 is supported for rotation and for bodily or translational movement by a support member 74. The support member 74 is pivotally mounted on the outside of side plates 36 and comprises two plates 76 and 78 which are interconnected at their lower ends by suitable fasteners, such as nuts and bolts. Plate 78 is spaced from plate 76 at its upper end. The upper end of plates 76 and 78 have bearings which journal a shaft 75 of wheel 72 and support the wheel 72 for rotation about a horizontal axis.

Figure 6:
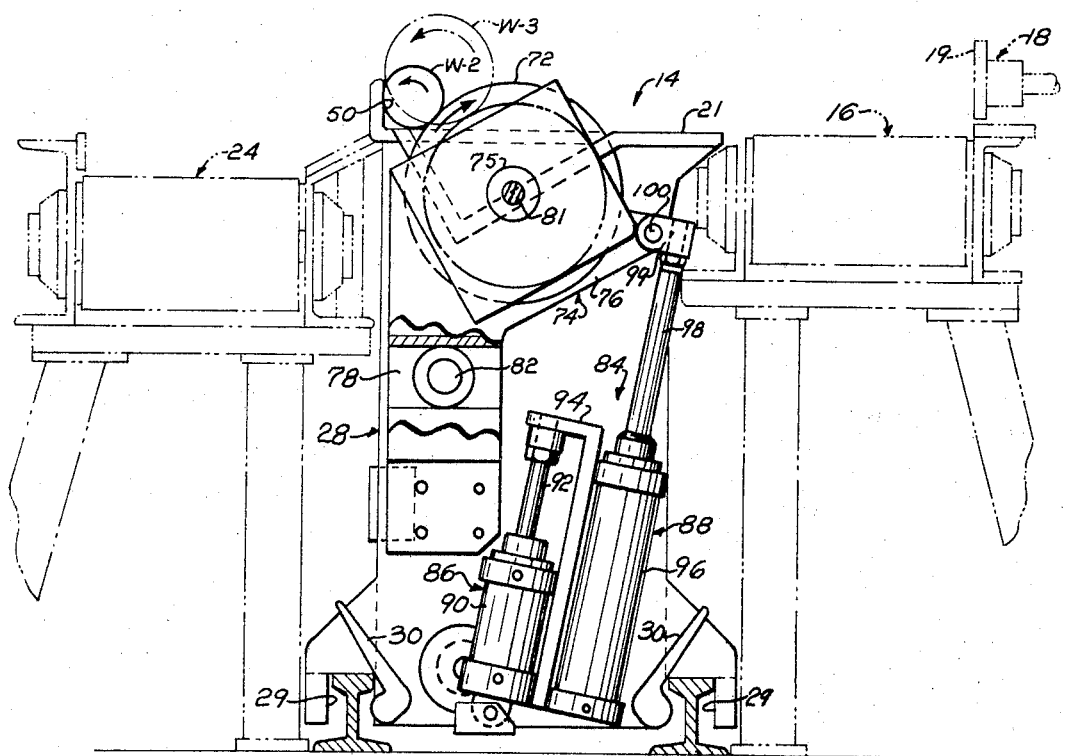
FIG. 6 is an elevational view of the apparatus embodying the present invention taken substantially along line 6—6 of FIG. 2.

The drive wheel 72 is rotated clockwise, as viewed in FIG. 6, by a motor 80. Motor 80 is preferably an electrical motor having a conventional speed reducing gear arrangement drivingly connected with the wheel, and for sake of clarity, is only shown schematically. Motor 80 is mounted on the outside of plate 78 and has a drive shaft 81 which is fixed against relative rotation in an opening provided in wheel shaft 75. Conventional electrical controls are provided to operate motor 80 and permit an operator to conveniently control the motor 80 during turning of the billets.

The drive wheel 72 is supported by wheel support member 74 for movement between an inoperative position in which the wheel 72 is below the horizontal plane of support surfaces 44 and an operative position whereing the periphery of the wheel moves through the horizontal plane and tangentially engages the workpiece so as to apply a vertical and horizontal component of force to the workpiece. The tangential contact between the rotating wheel 72 and the workpiece W-2 removes the workpiece from the horizontal support surfaces 46 and rotates the workpiece against the lateral support surfaces or abutments 50. Member 74 is supported on the outside of side plate 36 for pivotal movement about a horizontal axis by a pin 82 extending through plates 40 and 42 of side plate 36 and plate 76 of wheel support member 74. Member 74 is moved about the axis of pin 82 by a hydraulic motor means 84.

Motor means 84 includes two piston and cylinder-type motors 86 and 88 which are arranged so that by operating motor 88, the wheel support member 74 is moved upwardly about its pivot 82 through a first range of movement in which the drive wheel 72 is brought into driving engagement with the periphery of the relatively larger diameter workpieces W-3 which are to be rotated by the apparatus 10. This extent of movement of the wheel 72 is indicated by the dot-dash line representation of wheel 72 in FIG. 6. When smaller diameter workpieces W-2 are to be rotated by wheel 72, motor 88 is operated to move wheel 72 to the dot-dash line representation in FIG. 6 and motor 86 is operated to move the motor 88, member 74 and wheel 72 a further extent until it engages the surface of the smaller workpieces W-2. This positioning of the wheel is represented by the full line showing of wheel 72 in FIG. 6. Motor 86 includes a cylinder 90 pivotally connected to the frame 28 and has the usual piston rod 92 extending from the opposite end thereof. Piston rod 92 carries an inverted L-shaped bracket 94 which supports a cylinder 96 of motor 88. A piston rod 98 extends from cylinder 96 and is connected at its end to member 74 by a clevis 99 and pin 100. Suitable conventional controls are provided for controlling the application of fluid to the drive means 84 so that the motors 86 and 88 can be operated individually or jointly to accommodate different diameter workpieces.

Motor means 84 is operated by the controls to move the driving wheel into an operative position so that the wheel engages the surface of the workpiece and slightly elevates the workpiece from the horizontal support surfaces 44, 46 and against the lateral supports or abutments 50. The workpiece, at this time, is free to rotate relative to the support surfaces 44, 46 and 50 since the clamping member 52 has moved out of clamping engagement therewith. The wheel 72 is rotated clockwise, as viewed in FIG. 6, by the motor 80 and imparts a counterclockwise movement to the workpiece. The counterclockwise rotation of the workpiece minimizes the frictional engagement between the workpiece and the support surface. Clockwise rotation of the wheel 72 lifts the workpiece from the horizontal support surfaces 44 and 46 and minimizes the contact between the workpiece and the lateral support surfaces 50. By such an arrangement, there is minimum resistance to the rotation of the workpiece and lateral support surfaces 50 prevent the workpiece from rolling off the turning units 12 and 14.

The drive wheel 72, which is preferably a solid wheel constructed from friction material, such as neoprene, is maintained in engagement with the workpieces W-2 or W-3 until the workpiece has rotated a sufficient extent to present an unfinished surface to the grinding wheel 20. Thereafter, the drive wheel support member 74 is moved to lower the drive wheel below the plane of the horizontal support surfaces 44 to its inoperative position by control of the drive means 84. The clamping member 52 clamps the workpiece to the support surfaces 44, 46, and 50 and grinding operation on the newly presented surfaces is accomplished. These operations continue until the surface of the workpiece has been finished as desired, whereafter, the lift arms 48 are lowered and the clamping member 52 ejects the workpiece from the apparatus 10 onto the delivery conveyor 24.

As stated previously, the turning unit 12 is identical in construction and operation to the unit 14, which latter unit has been shown and described in detail. Suitable control means are provided for units 12 and 14 to insure that they act in unison on the workpieces.

From the foregoing, it should be apparent that a versatile apparatus for manipulating elongated workpieces has been provided which is capable of manipulating workpieces of different lengths and surface configurations. Although the preferred embodiment of the present invention has been shown and described in considerable detail, it is intended to cover all adaptations, modifications, and changes which come within the scope of the appended claims. For example, in the illustrated embodiment of the invention, workpieces, such as workpieces W–1 which have planar surfaces, are described as being rotated by toppling the workpiece off the stationary support surfaces 44. It should be appreciated, however, that workpieces W–1 having planar surfaces and particularly, those workpieces having a combination of planar and arcuate surface portions can be rotated by the drive wheel 72.

Having described my invention, I claim:

1. An apparatus for manipulating elongated workpieces comprising support means for supporting a workpiece and including first and second support surfaces angularly disposed relative to one another, said first support surfaces being arranged in a substantially vertical plane and providing lateral support for a workpiece and said second support surfaces being arranged in a substantially horizontal plane to engage an underside of the workpiece, means for rotating a workpiece having a planar surface, means for rotating a workpiece having an arcuate surface including a movable drive surface adapted to tangentially engage a workpiece to rotate the workpiece about its longitudinal axis, means supporting said drive surface for translational movement into and out of engagement with the workpiece and drive means for driving said drive surface.

2. An apparatus as defined in claim 1, wherein said means for rotating a workpiece having an arcuate surface includes a rotatable drive wheel providing said drive surface.

3. An apparatus as defined in claim 1, further including a clamping member supported for pivotal movement toward and away from said first support surfaces and operable to clamp a workpiece to said support surfaces and power means for moving said clamping member.

4. An apparatus as defined in claim 3, further including means supporting said first support surfaces for movement below the horizontal plane of said second support surfaces whereby said clamping member is operable to eject a workpiece laterally from the apparatus.

5. An apparatus for manipulating elongated workpieces, such as billets and the like, comprising means forming relatively narrow upwardly facing stationary support surfaces disposed in a horizontal plane and on which a workpiece may be partially supported so as to topple to one side thereof, a first support structure having a workpiece support surface at said one side of said stationary support surface and cooperable with said stationary support surface to position a workpiece substantially horizontal, a second support structure having a workpiece support surface at said one side of said stationary support surface and lying in a sloping plane, said last-mentioned surface being disposed to receive a workpiece toppled to said one side of said stationary support surface and to support said workpiece on a sloping plane, means for effecting relative vertical movement of said first and second support structures to shift a workpiece from one of said support structures to the other, a clamping member movable toward a vertical plane passing through said one side of said stationary support surface to engage and clamp a workpiece, a movable workpiece drive means including a drive surface engageable with the surface of the workpiece, and means supporting said drive surface for transfer from a position in which said drive surface is disposed to one side of said stationary support surface to a position in which said drive surface engages and operates to rotate a workpiece about its longitudinal axis.

6. An apparatus as defined in claim 5, wherein said first support structure includes a lateral support surface disposed in a vertical plane when said workpiece support surface thereof is disposed in a horizontal plane and providing a lateral support surface against which said workpiece bears when rotated by said drive surface.

7. An apparatus as defined in claim 5, wherein said drive means includes a rotatable drive wheel providing said drive surface and said means supporting said drive wheel comprises a member having spaced bearing plates at one end and between which said drive wheel is supported for rotation, means supporting said member for movement about a horizontal axis, drive means supported on one of said spaced bearing plates and being drivingly connected to said drive wheel to effect rotation thereof, and power means operatively connected to said member to effect movement of said member and said drive wheel.

8. An apparatus for manipulating an elongated workpiece which is generally circular in cross-section comprising support means for supporting a workpiece and including support surfaces, one of said surfaces providing a lateral support for said workpiece and the other of said surfaces being angularly disposed relative to said one surface so that said surfaces provide for supporting the workpiece at two spaced locations on the circumference thereof, a rotatable drive wheel, means supporting said drive wheel for movement between an inoperative position wherein the periphery of said wheel is at one side of said other of said support surfaces and an operative position wherein the periphery of said wheel engages and rotates a workpiece positioned on said support surfaces, and power means for rotating said drive wheel, said supporting means including an L-shaped member, means supporting said L-shaped member for movement to a position to provide a horizontally extending support surface and a vertically extending support surface defining said lateral support surface, a clamping member having a workpiece engaging portion, means supporting said clamping member for movement toward said lateral support surface and engageable with a workpiece when supported on said support surfaces to clamp the workpiece and movable away from said lateral support surface to release a workpiece.

9. An apparatus as defined in claim 8, wherein said support means further includes a stationary support surface disposed in a horizontal plane and adapted to engage the workpiece, and said L-shaped member is movable below the horizontal plane of said stationary support surfaces whereby said clamping member is operable to eject the workpiece from the apparatus.

10. An apparatus as defined in claim 8, wherein said means supporting said drive wheel comprises a member having spaced bearing plates at one end and between which said wheel is supported for rotation, said member being pivotally supported for movement about a horizontal axis, motor means supported on one of said spaced bearing plates and being drivingly connected to said drive wheel to effect rotation thereof, and power means operatively connected to said member to effect movement of said member and said drive wheel between said operative and inoperative positions.

11. An apparatus as defined in claim 10, wherein said power means includes first and second reciprocating-type motor means operatively connected to said member supporting said drive wheel, said first motor means being operable to move said drive wheel a first extent and said second motor means being operable to move said drive wheel a second extent.

12. An apparatus for manipulating elongated workpieces which have arcuate surfaces comprising means for supporting a workpiece and including support surfaces angularly arranged relative to one another to engage the workpiece at spaced locations about the circumference thereof, one of said support surfaces being arranged in a generally vertical plane and providing a lateral support for the workpiece and the other of said support surfaces being arranged in a horizontal plane and abuttable with the underside of a workpiece, means for rotating the workpiece about its longitudinal axis including a drive surface engageable with the workpiece, power means for driving said drive surface and means supporting said drive surface for translational movement into tangential contact with the surface of the workpiece to thereby rotate the workpiece against said one support surface, said support means including a stationary support surface in said horizontal plane and designed for abutment with the underneath side of a workpiece, and means for moving said one support surface below said horizontal plane so that a workpiece abutting said stationary support surface may be moved beyond said vertical plane in the course of being ejected from the apparatus.

13. An apparatus as defined in claim 12, further including clamping means engageable with the workpiece on said stationary support surface and being operable to eject the workpiece from the apparatus when said lateral support surface is disposed below said horizontal plane.

14. An apparatus as defined in claim 12, wherein said means for rotating a workpiece includes a rotatable drive wheel providing said drive surface.

References Cited

UNITED STATES PATENTS

| | | | |
|---|---|---|---|
| 2,588,714 | 3/1952 | Fleming | 214—340 X |
| 3,258,144 | 6/1966 | Reschre | 214—340 |

GERALD M. FORLENZA, *Primary Examiner.*

F. E. WERNER, *Assistant Examiner.*

U.S. Cl. X.R.

214—1